(12) United States Patent
Ashley

(10) Patent No.: US 11,369,856 B2
(45) Date of Patent: Jun. 28, 2022

(54) FIRST DOWN INDICATOR ASSEMBLY

(71) Applicant: Raymond Ashley, Jackson, MS (US)

(72) Inventor: Raymond Ashley, Jackson, MS (US)

( * ) Notice: Subject to any disclaimer, the term of this patent is extended or adjusted under 35 U.S.C. 154(b) by 518 days.

(21) Appl. No.: 16/573,278

(22) Filed: Sep. 17, 2019

(65) Prior Publication Data

US 2021/0077885 A1    Mar. 18, 2021

(51) Int. Cl.
*A63B 71/06* (2006.01)
*A63B 43/06* (2006.01)
*G01C 5/00* (2006.01)
*A63B 43/00* (2006.01)

(52) U.S. Cl.
CPC .............. *A63B 71/06* (2013.01); *A63B 43/06* (2013.01); *G01C 5/00* (2013.01); *A63B 43/002* (2013.01); *A63B 2071/0694* (2013.01); *A63B 2225/50* (2013.01); *A63B 2243/007* (2013.01)

(58) Field of Classification Search
CPC ....... A63B 71/06; A63B 43/06; A63B 43/002; A63B 2071/0694; A63B 2225/50; A63B 2243/007; A63B 2071/025; A63B 2071/0691; A63B 2220/20; G01C 5/00
See application file for complete search history.

(56) References Cited

U.S. PATENT DOCUMENTS

| | | | | |
|---|---|---|---|---|
| 2,935,792 A * | 5/1960 | Huffaker | ................ | A63B 71/06 33/272 |
| 3,741,662 A * | 6/1973 | Pioch | .................... | G01C 15/002 356/399 |
| 3,985,356 A * | 10/1976 | Carlock | ............. | A63B 71/0605 356/400 |
| 6,851,198 B1 * | 2/2005 | Harty | ................. | A63B 71/0605 33/289 |
| 6,987,840 B1 | 1/2006 | Bosik et al. | | |
| 7,185,439 B1 * | 3/2007 | Nubin | ....................... | G01S 5/02 473/490 |
| 7,770,297 B1 * | 8/2010 | Sommerfeld | ...... | A63B 71/0605 33/DIG. 21 |
| 8,220,170 B1 * | 7/2012 | Winckler | ........... | A63B 71/0605 362/431 |
| 9,433,849 B1 * | 9/2016 | Brown | ...................... | A43B 3/34 |
| 2008/0256811 A1 * | 10/2008 | Garza | .................. | A63B 69/002 33/759 |
| 2014/0259708 A1 * | 9/2014 | Foster | ................. | A63B 71/0605 33/289 |
| 2019/0269999 A1 * | 9/2019 | Amron | .................. | G01C 15/004 |
| 2019/0290992 A1 * | 9/2019 | Foster | ................. | A63B 71/0619 |
| 2021/0220720 A1 * | 7/2021 | Harriger | .................. | G01C 9/02 |

* cited by examiner

*Primary Examiner* — Steven B Wong

(57) ABSTRACT

A first down indicator assembly includes cart that is rollable along a sideline of an American football field. A pair of laser units is each of the laser units is coupled to the cart. Each of the laser units emits a location beam outwardly onto the American football field. The laser units are spaced 10.0 yards apart from each other thereby facilitating officials to determine when a first down is achieved by a football team. An American football visibly renders the location beam from a respective one of the laser units when a football team achieves the first down. A display unit is coupled to the cart thereby facilitating the display unit to be visible to players on the American football field. The display unit displays a variety of indicia for indicating information relating the American football.

15 Claims, 5 Drawing Sheets

FIRST DOWN INDICATOR ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to indicator devices and more particularly pertains to a new indicator device for displaying a first down mark on an American football field in real time.

(2) Description of Related Art Including Information Disclosed Under 37 CFR 1.97 and 1.98

The prior art relates to indicator devices.

BRIEF SUMMARY OF THE INVENTION

An embodiment of the disclosure meets the needs presented above by generally comprising a cart that is rollable along a sideline of an American football field. A pair of laser units is each of the laser units is coupled to the cart. Each of the laser units emits a location beam outwardly onto the American football field. The laser units are spaced 10.0 yards apart from each other thereby facilitating officials to determine when a first down is achieved by a football team. An American football visibly renders the location beam from a respective one of the laser units when a football team achieves the first down. A display unit is coupled to the cart thereby facilitating the display unit to be visible to players on the American football field. The display unit displays a variety of indicia for indicating information relating the American football.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 2:
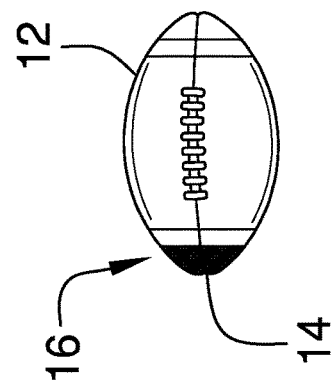
FIG. 2 is a perspective view of an American football of an embodiment of the disclosure.
Figure 1:
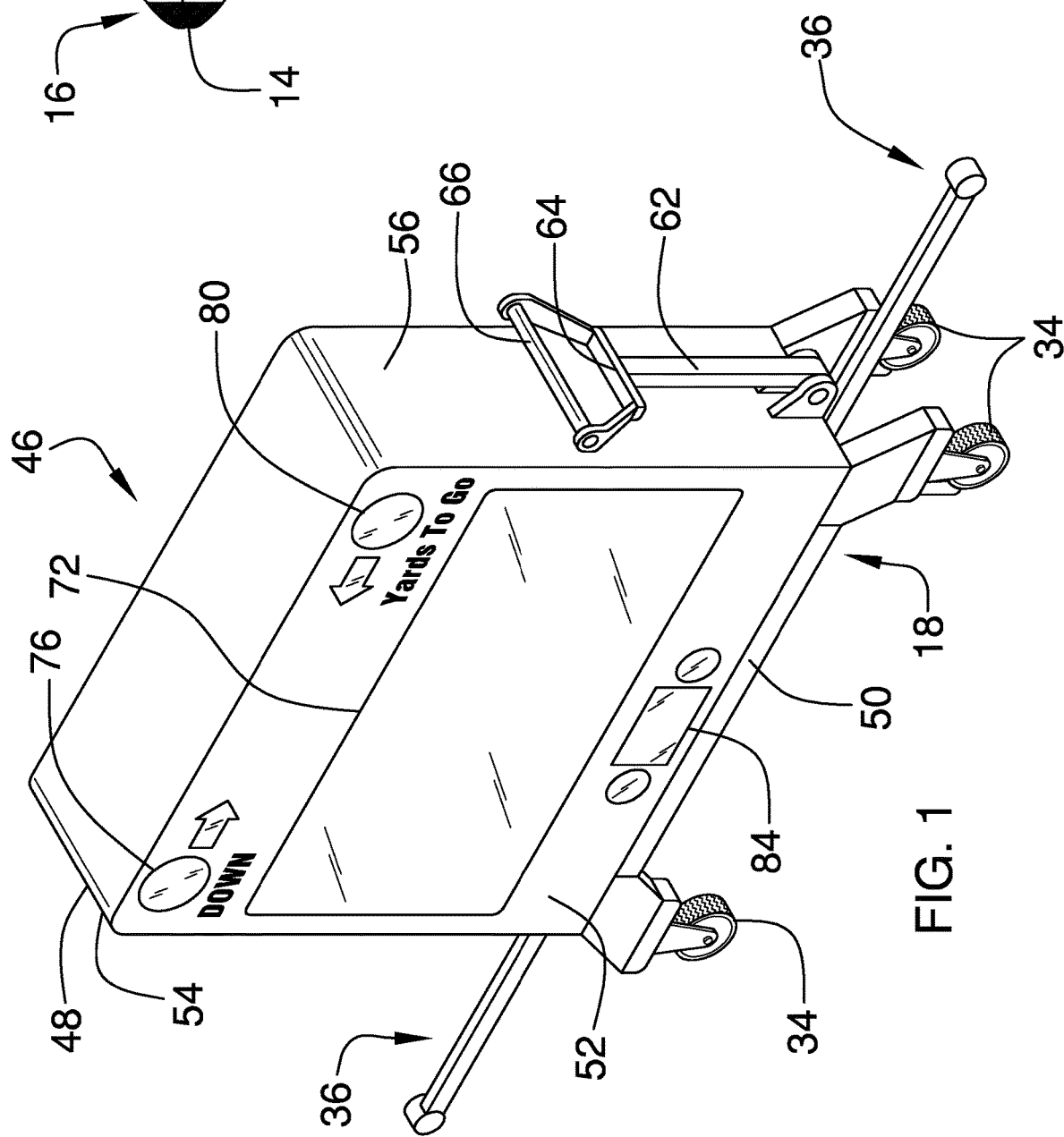
FIG. 1 is a perspective view of a first down indicator assembly according to an embodiment of the disclosure.
Figure 3:
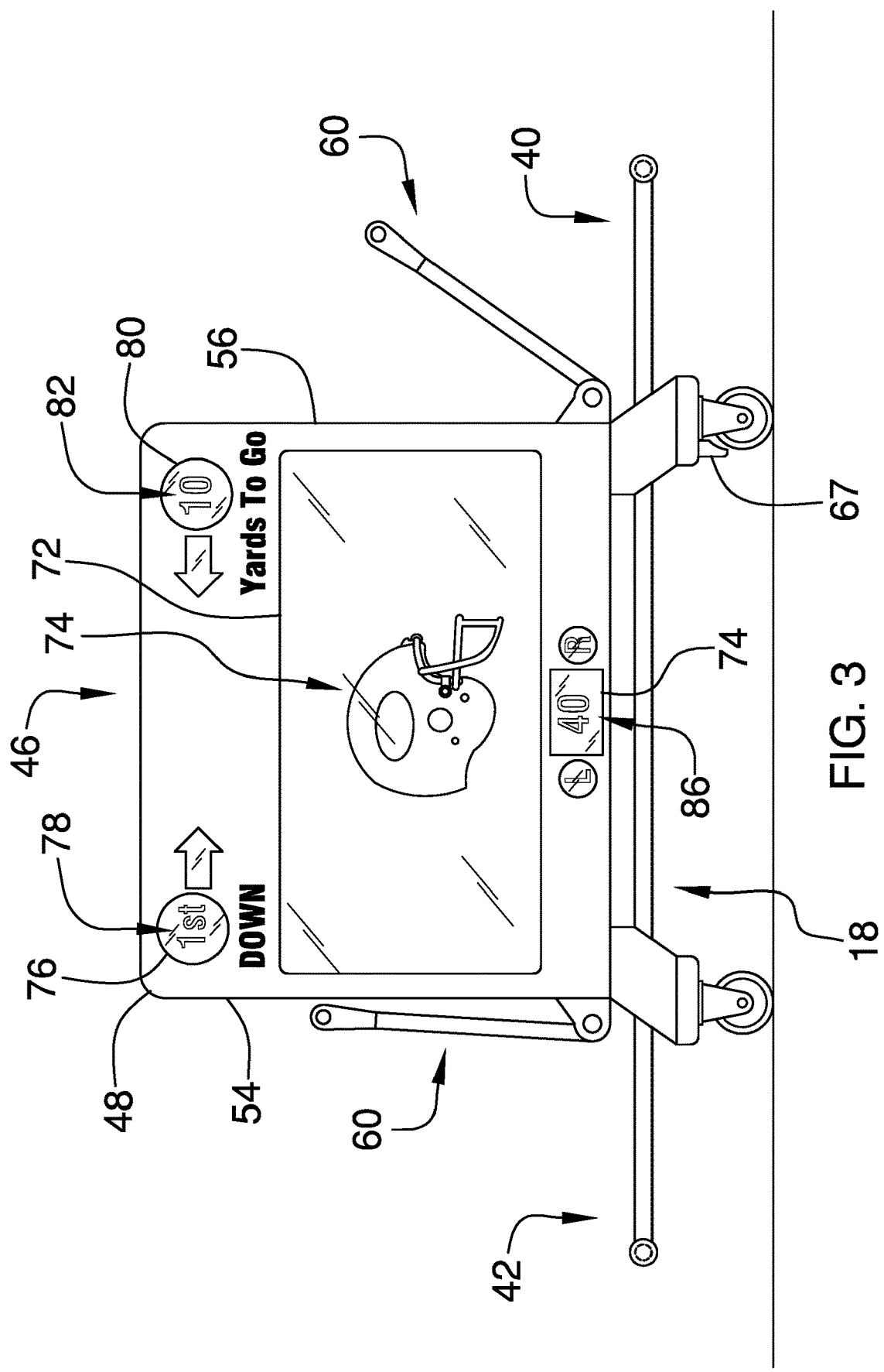
FIG. 3 is a front view of an embodiment of the disclosure.
Figure 4:
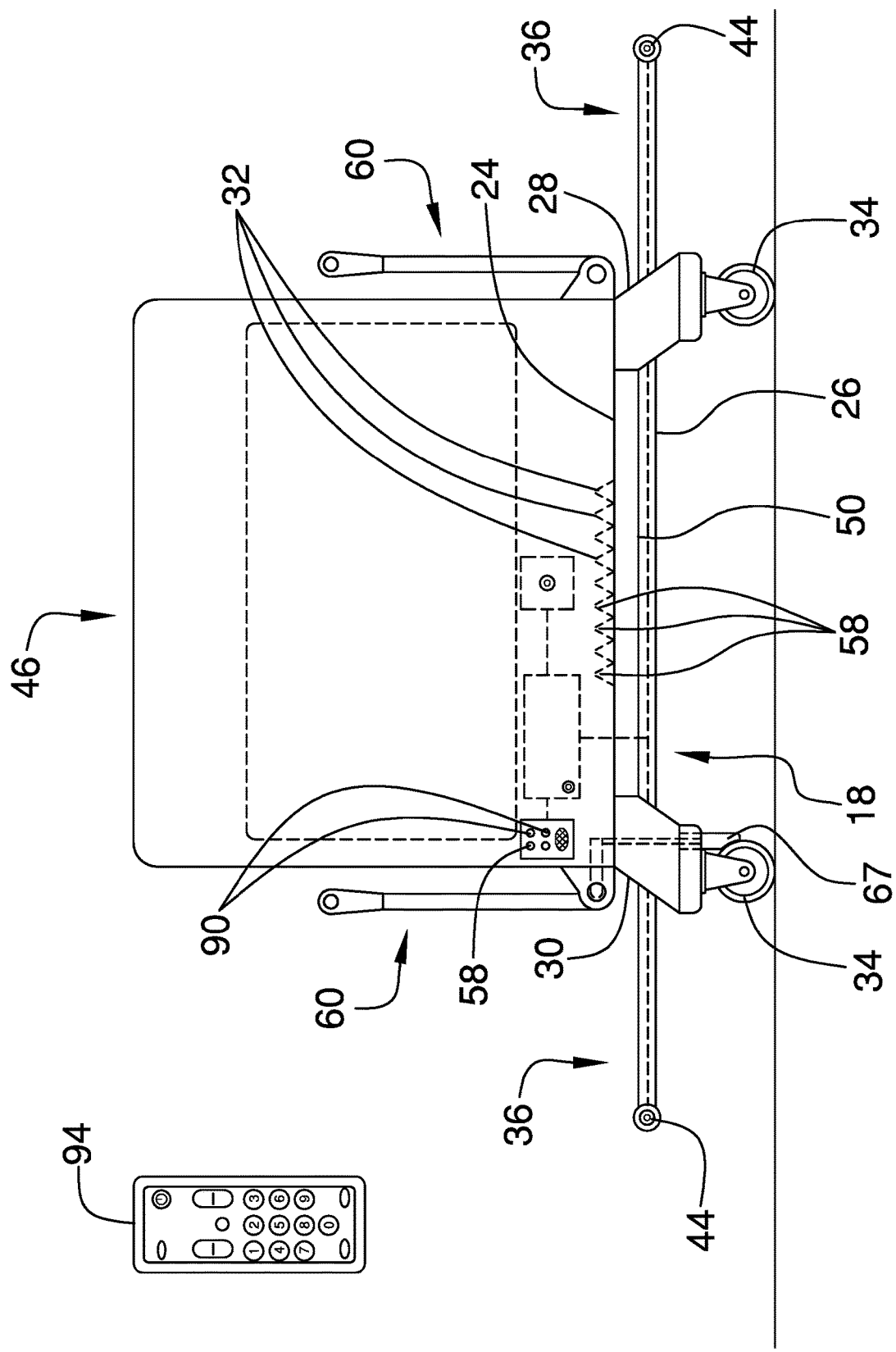
FIG. 4 is a back phantom view of an embodiment of the disclosure.
Figure 5:
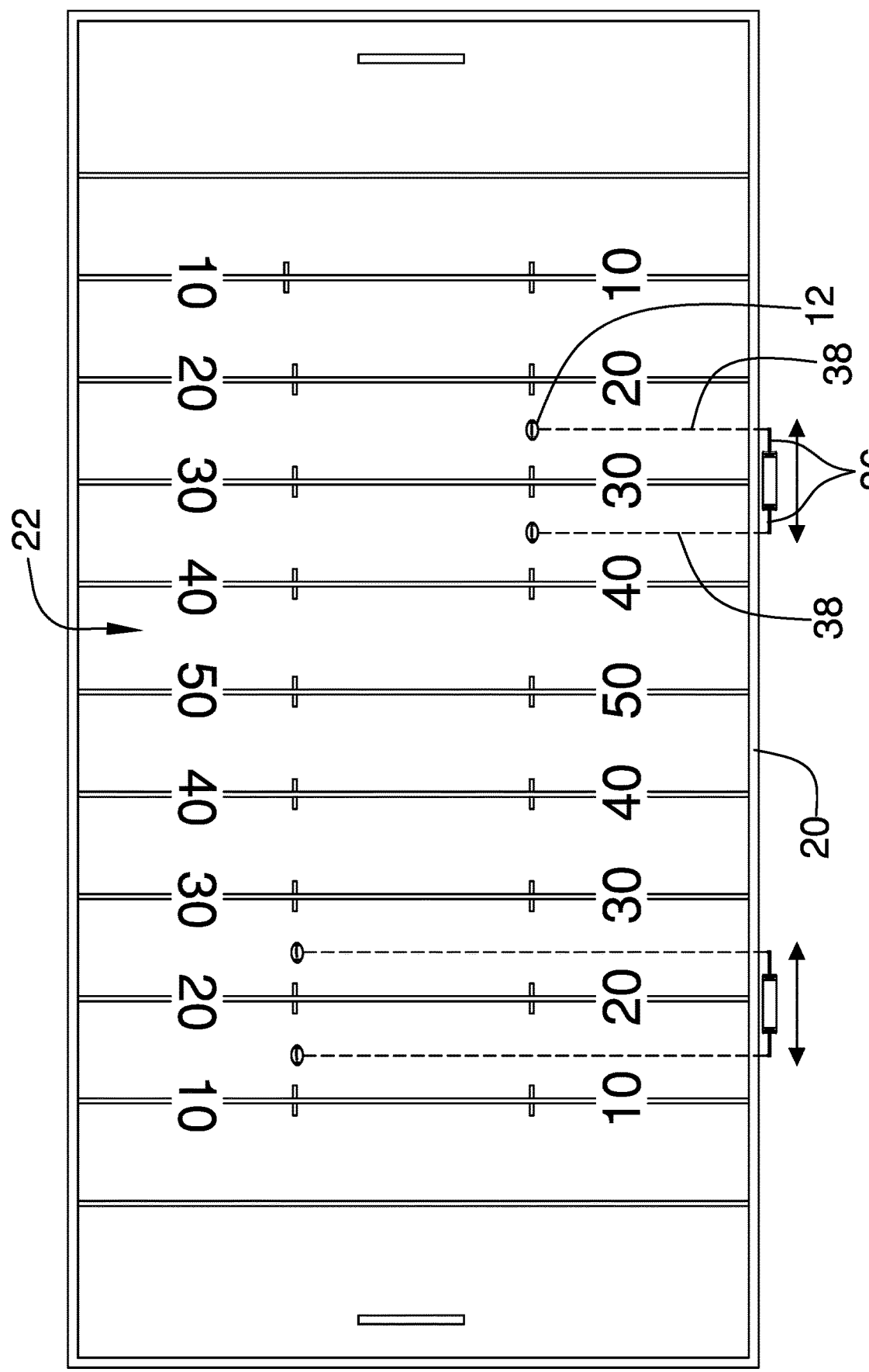
FIG. 5 is a perspective in-use view of an embodiment of the disclosure.
Figure 6:
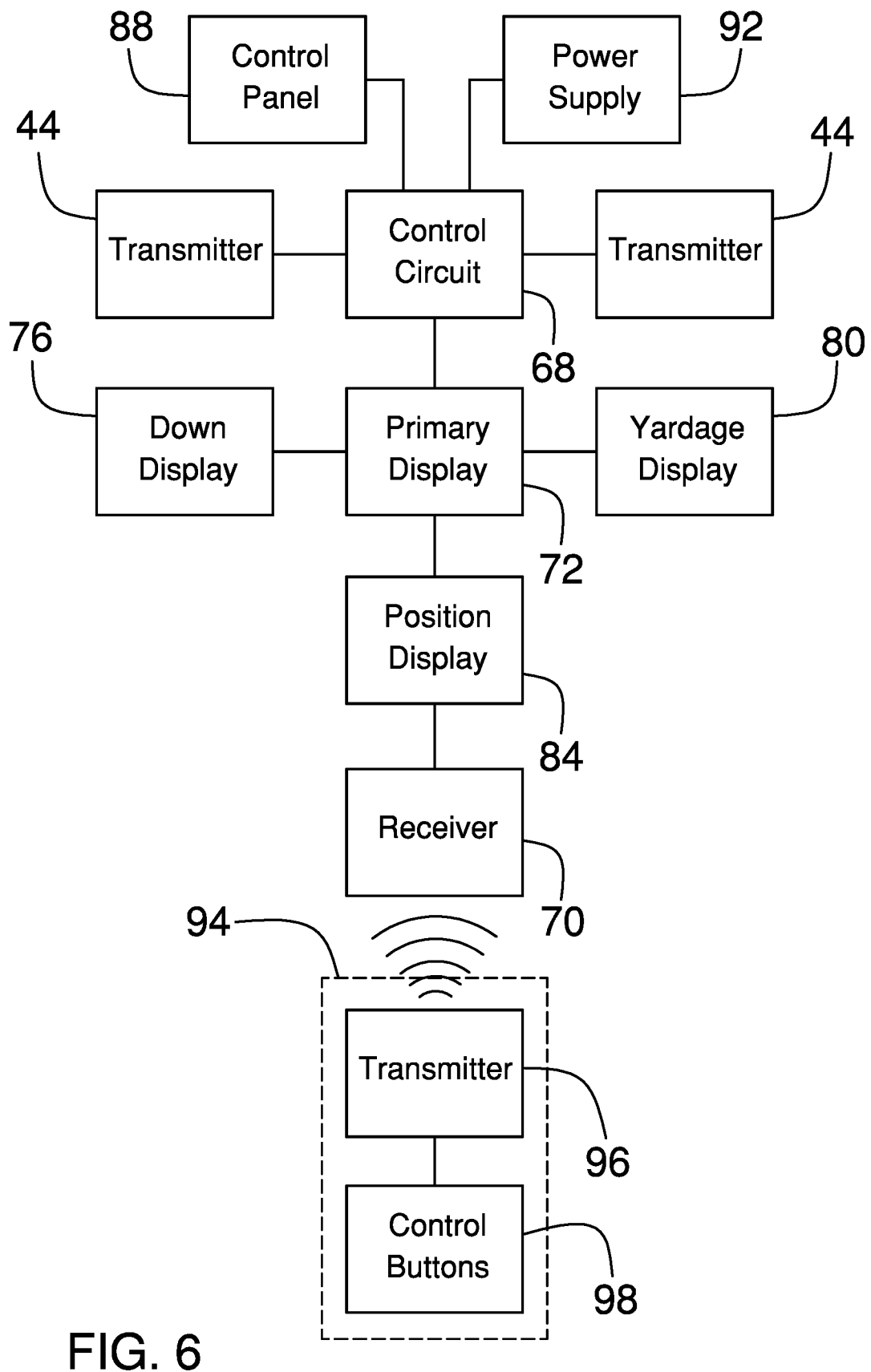
FIG. 6 is a schematic view of an embodiment of the disclosure.

With reference now to the drawings, and in particular to FIGS. 1 through 6 thereof, a new indicator device embodying the principles and concepts of an embodiment of the disclosure and generally designated by the reference numeral 10 will be described.

As best illustrated in FIGS. 1 through 6, the first down indicator assembly 10 generally comprises an American football 12 that has a primary end 14. Additionally, the American football 12 has a blackened portion 16 that is positioned adjacent to the primary end 14. The blackened portion 16 is comprised of a light reflecting material. In this way the blackened portion 16 can visibly render a laser beam that is directed onto the blackened portion 16.

A cart 18 is rollable along a sideline 20 of an American football field 22. The cart 18 has a top side 24, a bottom side 26, a first end 28 and a second end 30, and the cart 18 is elongated between the first end 28 and the second end 30. The top side 24 has a plurality of teeth 32 each extending upwardly therefrom. The teeth 32 are spaced apart from each other and are distributed along a line extending between the first end 28 and the second end 30. Additionally, the plurality of teeth 32 is centrally positioned between the first end 28 and the second end 30. A plurality of rollers 34 is each rotatably coupled to the cart 18 for rolling along the sideline 20. Each of the rollers 34 is positioned on the bottom side 26 and each of the rollers 34 is aligned with a respective one of four corners of the bottom side 26.

A pair of laser units 36 is provided and each of the laser units 36 is coupled to and extends laterally away from the cart 18. Each of the laser units 36 emits a location beam 38 outwardly onto the American football field 22. Moreover, the laser units 36 are spaced 10.0 yards apart from each other thereby facilitating officials to determine when a first down is achieved by a football team. The blackened portion 16 of the American football 12 visibly renders the location beam 38 from a respective one of the laser units 36 when the football team achieves the first down. In this way the laser units 36 enhance the official's ability to accurately determine when the first down is achieved. The pair of laser units 36 includes a first laser unit 40 and a second laser unit 42.

Each of the laser units 36 is positioned on a respective one of the first end 28 or the second end 30 of the cart 18. Each of the laser units 36 is oriented to extend along a horizontal axis. Additionally, each of the laser units 36 has a transmitter 44 that is distally positioned with respect to the respective first end 28 or the second end 30. The transmitter 44 on each of the laser units 36 emits the location beam 38 along a horizontal axis that is oriented perpendicular to an axis extending through the first end 28 and the second end 30 of the cart 18. In this way the transmitter 44 emits the location beam 38 extending across each sideline 20 of the American football field 22. Additionally, the transmitter 44 on each of the laser units 36 may comprise a laser diode that has an operational power output of less than 5.0 mW.

A display unit 46 is coupled to the cart 18 thereby facilitating the display unit 46 to be visible to players on the American football field 22. The display unit 46 displays a variety of indicia for indicating the number of yards remaining for a first down, the current down and other information relating the American football 12. The display unit 46 is in electrical communication with each of the laser units 36.

The display unit 46 comprises a housing 48 that has a bottom wall 50, a front wall 52, a first lateral wall 54 and a second lateral wall 56. The bottom wall 50 has a plurality of engagement points 58 that is each recessed into the bottom wall 50. Each of the engagement points 58 receives a respective one of the teeth 32 on the top side 24 of the cart 18 for retaining the housing 48 on the cart 18. The front wall 52 is directed toward the sideline 20 of the American football field 22.

A pair of handles 60 is provided and each of the handles 60 is pivotally coupled to a respective one of the first lateral wall 54 or the second lateral wall 56 of the housing 48. Each of the handles 60 is positionable in a stored position having the handles 60 extending upwardly along the respective first lateral wall 54 or the second lateral wall 56 of the housing 48. Each of the handles 60 is positionable in a deployed position having the handles 60 extending laterally away from the respective first lateral wall 54 or the second lateral wall 56 of the housing 48 for moving the cart 18 along the sideline 20. Each of the handles 60 may include a rod 62 having a distal end 64 with respect to the housing 48 and a grip 66 that is coupled to and oriented transverse to the distal end 64 of the rod 62.

A lock 67 is movably coupled to the housing 48 and the lock 67 is in mechanical communication with a respective one of the handles 60. The lock 67 is engages a respective one of the rollers 34 when the respective handle 60 is positioned in the stored position. In this way the cart 18 is inhibited from rolling. The lock 67 disengages the respective roller 34 when the respective handle 60 is positioned in the deployed position for rolling the cart 18. The display unit 46 includes a control circuit 68 that is coupled to the housing 48. The transmitter 44 on each of the laser units 36 is electrically coupled to the control circuit 68. A receiver 70 is coupled to the housing 48 and the receiver 70 is electrically coupled to the control circuit 68. The receiver 70 may comprise a radio frequency receiver or the like.

A primary display 72 is coupled to the front wall 52 of the housing 48 and the primary display 72 is electrically coupled to the control circuit 68. The primary display 72 displays logo indicia 74 comprising an image of the American football team that is currently playing offense. The primary display 72 may comprise an LED or other electronic display.

A down display 76 is coupled to the front wall 52 of the housing 48 and the down display 76 is electrically coupled to the control circuit 68. The down display 76 displays down indicia 78 comprising numbers to indicate the current down. The down display 76 may comprise an LED or other electronic display.

A yardage display 80 is coupled to the front wall 52 of the housing 48 and the yardage display 80 is electrically coupled to the control circuit 68. The yardage display 80 displays yardage indicia 82 comprising numbers to indicate yards to go for a first down. The yardage display 80 may comprise an LED or other electronic display. A position display 84 is coupled to the front wall 52 of the housing 48 and the position display 84 is electrically coupled to the control circuit 68. The position display 84 displays position indicia 86 comprising numbers to indicate the current position of the American football team playing offense with respect to yardage on the American football field 22. The position display 84 may comprise an LED or other electronic display.

A control panel 88 is coupled to the housing 48 and the control panel 88 is electrically coupled to the control circuit 68. The control panel 88 has a plurality of buttons 90 thereon and each of the buttons 90 controls operational parameters of the primary display 72, the down display 76, the yardage display 80 and the position display 84. A power supply 92 is positioned in the housing 48, the power supply 92 is electrically coupled to the control circuit 68 and the power supply 92 comprises at least one rechargeable battery.

A remote control 94 is provided that can be carried by an operator. The remote control 94 is in wireless communication with the display unit 46. The remote control 94 controls operational parameters of the display unit 46 with respect to the variety of indicia that is displayed on the display unit 46. The remote control 94 includes a transmitter 96 that is in wireless communication with the receiver 70. Additionally, the remote control 96 has a plurality of control buttons 98 thereon. Each of the control buttons 98 on the remote control 94 controls operational parameters of each of the primary display 72, the down display 76, the yardage display 80 and the position display 84.

In use, the cart 18 is positioned next to the sideline 20 of the American football field 22 such that each of the laser units 36 emits the location beam 38 across the American football field 22. The location beam 38 emitted by the first laser unit 40 is aligned with the American football 12 when the American football 12 is placed to indicate first down. In this way the location beam 38 emitted by the second laser unit 42 indicates the location the American football 12 must reach for a subsequent first down. The blackened portion 16 of on the American Football 12 will display the location beam 38 emitted by the second laser unit 42 when the officials place the American football 12 on the field to determine if the subsequent first down has been achieved. Additionally, either the remote control 94 or the control panel 88 are manipulated to display the required variety of indicia on the display unit 46 so players on the field can keep track of the remaining yardage required for the subsequent first down and other information.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A first down indicator assembly being configured to indicate a first down in American football, said assembly comprising:
   an American football having a primary end, said American football having a blackened portion being positioned adjacent to said primary end, said blackened portion being comprised of a light reflecting material wherein said blackened portion is configured to visibly render a laser beam directed onto said blackened portion;
   a cart being rollable along a sideline of an American football field;
   a pair of laser units, each of said laser units being coupled to and extending laterally away from said cart, each of said laser units emitting a location beam outwardly onto the American football field, said laser units being spaced 10.0 yards apart from each other thereby facilitating officials to determine when a first down is achieved by a football team, said blackened portion of said American football visibly rendering said location beam from a respective one of said laser units when the football team achieves the first down wherein said laser units are configured to enhance the official's ability to accurately determine when the first down is achieved;
   a display unit being coupled to said cart thereby facilitating said display unit to be visible to players on the American football field, said display unit displaying a variety of indicia for indicating the number of yards remaining for a first down, the current down and other information relating the American football, said display unit being in electrical communication with each of said laser units; and
   a remote control being carried by an operator, said remote control being in wireless communication with said display unit, said remote control controlling operational parameters of said display unit with respect to said variety of indicia being displayed on said display unit.

2. The assembly according to claim 1, wherein said cart has a top side, a bottom side, a first end and a second end, said cart being elongated between said first end and said second end, said top side having a plurality of teeth each extending upwardly therefrom, said teeth being spaced apart from each other and being distributed along a line extending between said first end and said second end, said plurality of teeth being centrally positioned between said first end and said second end.

3. The assembly according to claim 2, further comprising a plurality of rollers, each of said rollers being rotatably coupled to said cart for rolling along the sideline, each of said rollers being positioned on said bottom side, each of said rollers being aligned with a respective one of four corners of said bottom side.

4. The assembly according to claim 2, wherein each of said laser units is positioned on a respective one of said first end or said second end of said cart, each of said laser units being oriented to extend along a horizontal axis, each of said laser units having a transmitter being distally positioned with respect to said respective first end or said second end, said transmitter on each of said laser units emitting said location beam along a horizontal axis being oriented perpendicular to an axis extending through said first end and said second end of said cart wherein said transmitter is configured to emit said location beam extending across each sideline of the American football field.

5. The assembly according to claim 4, wherein said display unit comprises a housing having a bottom wall, a front wall, a first lateral wall and a second lateral wall, said bottom wall having a plurality of engagement points each being recessed into said bottom wall, each of said engagement points receiving a respective one of said teeth on said top side of said cart for retaining said housing on said cart, said front wall being directed toward the sideline of the American football field.

6. The assembly according to claim 5, further comprising a pair of handles, each of said handles being pivotally coupled to a respective one of said first lateral wall or said second lateral wall of said housing, each of said handles being positionable in a stored position having said handles extending upwardly along said respective first lateral wall or said second lateral wall of said housing, each of said handles being positionable in a deployed position having said handles extending laterally away from said respective first lateral wall or said second lateral wall of said housing for moving said cart along the sideline.

7. The assembly according to claim 6, wherein said display unit includes:
   a control circuit being coupled to said housing, said transmitter on each of said laser units being electrically coupled to said control circuit; and
   a receiver being coupled to said housing, said receiver being electrically coupled to said control circuit.

8. The assembly according to claim 7, wherein said display unit includes a primary display being coupled to said front wall of said housing, said primary display being electrically coupled to said control circuit, said primary display displaying logo indicia comprising an image of the American football team that is currently playing offense.

9. The assembly according to claim 8, wherein said display unit includes a down display being coupled to said front wall of said housing, said down display being electrically coupled to said control circuit, said down display displaying down indicia comprising numbers to indicate the current down.

10. The assembly according to claim 9, wherein said display unit includes a yardage display being coupled to said front wall of said housing, said yardage display being electrically coupled to said control circuit, said yardage display displaying yardage indicia comprising numbers to indicate yards to go for a first down.

11. The assembly according to claim 10, wherein said display unit includes a position display being coupled to said front wall of said housing, said position display being electrically coupled to said control circuit, said position display displaying position indicia comprising numbers to indicate the current position of the American football team playing offense with respect to yardage on the American football field.

12. The assembly according to claim 11, wherein said display unit includes a control panel being coupled to said housing, said control panel being electrically coupled to said control circuit, said control panel having a plurality of buttons thereon, each of said buttons controlling operational parameters of said primary display, said down display, said yardage display and said position display.

13. The assembly according to claim 12, wherein said display unit includes a power supply being positioned in said housing, said power supply being electrically coupled to said control circuit, said power supply comprising at least one rechargeable battery.

14. The assembly according to claim 11, wherein said remote control includes a transmitter being in wireless communication with said receiver, said remote control having a plurality of control buttons thereon, each of said control buttons on said remote control controlling operational parameters of each of said primary display, said down display, said yardage display and said position display.

15. A first down indicator assembly being configured to indicate a first down in American football, said assembly comprising:

an American football having a primary end, said American football having a blackened portion being positioned adjacent to said primary end, said blackened portion being comprised of a light reflecting material wherein said blackened portion is configured to visibly render a laser beam directed onto said blackened portion;

a cart being rollable along a sideline of an American football field, said cart having a top side, a bottom side, a first end and a second end, said cart being elongated between said first end and said second end, said top side having a plurality of teeth each extending upwardly therefrom, said teeth being spaced apart from each other and being distributed along a line extending between said first end and said second end, said plurality of teeth being centrally positioned between said first end and said second end;

a plurality of rollers, each of said rollers being rotatably coupled to said cart for rolling along the sideline, each of said rollers being positioned on said bottom side, each of said rollers being aligned with a respective one of four corners of said bottom side;

a pair of laser units, each of said laser units being coupled to and extending laterally away from said cart, each of said laser units emitting a location beam outwardly onto the American football field, said laser units being spaced 10.0 yards apart from each other thereby facilitating officials to determine when a first down is achieved by a football team, said blackened portion of said American football visibly rendering said location beam from a respective one of said laser units when the football team achieves the first down wherein said laser units are configured to enhance the official's ability to accurately determine when the first down is achieved, each of said laser units being positioned on a respective one of said first end or said second end of said cart, each of said laser units being oriented to extend along a horizontal axis, each of said laser units having a transmitter being distally positioned with respect to said respective first end or said second end, said transmitter on each of said laser units emitting said location beam along a horizontal axis being oriented perpendicular to an axis extending through said first end and said second end of said cart wherein said transmitter is configured to emit said location beam extending across each sideline of the American football field;

a display unit being coupled to said cart thereby facilitating said display unit to be visible to players on the American football field, said display unit displaying a variety of indicia for indicating the number of yards remaining for a first down, the current down and other information relating the American football, said display unit being in electrical communication with each of said laser units, said display unit comprising:

a housing having a bottom wall, a front wall, a first lateral wall and a second lateral wall, said bottom wall having a plurality of engagement points each being recessed into said bottom wall, each of said engagement points receiving a respective one of said teeth on said top side of said cart for retaining said housing on said cart, said front wall being directed toward the sideline of the American football field;

a pair of handles, each of said handles being pivotally coupled to a respective one of said first lateral wall or said second lateral wall of said housing, each of said handles being positionable in a stored position having said handles extending upwardly along said respective first lateral wall or said second lateral wall of said housing, each of said handles being positionable in a deployed position having said handles extending laterally away from said respective first lateral wall or said second lateral wall of said housing for moving said cart along the sideline;

a control circuit being coupled to said housing, said transmitter on each of said laser units being electrically coupled to said control circuit;

a receiver being coupled to said housing, said receiver being electrically coupled to said control circuit;

a primary display being coupled to said front wall of said housing, said primary display being electrically coupled to said control circuit, said primary display displaying logo indicia comprising an image of the American football team that is currently playing offense;

a down display being coupled to said front wall of said housing, said down display being electrically coupled to said control circuit, said down display displaying down indicia comprising numbers to indicate the current down;

a yardage display being coupled to said front wall of said housing, said yardage display being electrically coupled to said control circuit, said yardage display displaying yardage indicia comprising numbers to indicate yards to go for a first down;

a position display being coupled to said front wall of said housing, said position display being electrically coupled to said control circuit, said position display displaying position indicia comprising numbers to indicate the current position of the American football team playing offense with respect to yardage on the American football field;

a control panel being coupled to said housing, said control panel being electrically coupled to said control circuit, said control panel having a plurality of buttons thereon, each of said buttons controlling operational parameters of said primary display, said down display, said yardage display and said position display; and a power supply being positioned in said housing, said power supply being electrically coupled to said control circuit, said power supply comprising at least one rechargeable battery; and a remote control being carried by an operator, said remote control being in wireless communication with said display unit, said remote control controlling operational parameters of said display unit with respect to said variety of indicia being displayed on said display unit, said remote control including a transmitter being in wireless communication with said receiver, said remote control having a plurality of control buttons thereon, each of said control buttons on said remote control controlling operational parameters of each of said primary display, said down display, said yardage display and said position display.

\* \* \* \* \*